US010833974B2

(12) United States Patent
Caire et al.

(10) Patent No.: US 10,833,974 B2
(45) Date of Patent: Nov. 10, 2020

(54) DYNAMIC CONFIGURATION OF ROUTING PATHS IN A DATA NETWORK

(71) Applicant: TELECOM ITALIA S.p.A., Milan (IT)

(72) Inventors: Giovanni Caire, Turin (IT); Carlo Cinato, Turin (IT); Danilo Gotta, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/775,971

(22) PCT Filed: Nov. 30, 2015

(86) PCT No.: PCT/EP2015/078023
§ 371 (c)(1),
(2) Date: May 14, 2018

(87) PCT Pub. No.: WO2017/092780
PCT Pub. Date: Jun. 8, 2017

(65) Prior Publication Data
US 2018/0324083 A1 Nov. 8, 2018

(51) Int. Cl.
*G01R 31/08* (2020.01)
*H04L 12/721* (2013.01)
*H04L 12/715* (2013.01)

(52) U.S. Cl.
CPC ............ *H04L 45/124* (2013.01); *H04L 45/64* (2013.01)

(58) Field of Classification Search
USPC ....... 370/238, 229, 231, 236, 237, 250, 252, 370/255, 400
See application file for complete search history.

(56) References Cited

U.S. PATENT DOCUMENTS

| 6,275,470 | B1 | 8/2001 | Ricciulli |
| 7,580,360 | B2 * | 8/2009 | Bryant ................... H04L 45/02 370/231 |

(Continued)

FOREIGN PATENT DOCUMENTS

| WO | WO 2015/106794 A1 | 7/2015 | |
| WO | WO 2015/133950 A1 | 9/2015 | |
| WO | WO-2015133950 A1 * | 9/2015 | ........... H04L 45/124 |

OTHER PUBLICATIONS

International Search Report dated Jul. 18, 2016, in PCT/EP2015/078023 filed Nov. 30, 2015.

(Continued)

*Primary Examiner* — Phuongchau Ba Nguyen
(74) *Attorney, Agent, or Firm* — Oblon, McClelland, Maier & Neustadt, L.L.P.

(57) ABSTRACT

A method for selecting routing paths of data packets in a data network including plural communication links and routing apparatuses. The method includes: calculating and assigning to the communication links respective communication links' costs; calculating, for at least two different routing paths, respective routing path overall costs, which depend on the communication links' costs assigned to communication links making up such routing path; selecting, among the at least two different routing paths, the routing path having the lower routing path overall cost; causing a new data packet to be routed in the data network over the selected routing path, and collecting measures indicative of at least one performance parameter indicating a performance of previous transmissions of data packets from origin end points of the data network to destination end points of the data network, and using the collected measures for calculating the communication links' costs.

16 Claims, 4 Drawing Sheets

(56) References Cited

U.S. PATENT DOCUMENTS

| | | | |
|---|---|---|---|
| 2001/0037409 A1* | 11/2001 | Ricciulli | F25B 41/003 |
| | | | 719/310 |
| 2002/0018449 A1 | 2/2002 | Ricciulli | |
| 2004/0022194 A1 | 2/2004 | Ricciulli | |
| 2005/0066052 A1* | 3/2005 | Gupta | H04L 45/02 |
| | | | 709/238 |
| 2008/0101244 A1* | 5/2008 | Liu | H04L 45/00 |
| | | | 370/238 |
| 2011/0228678 A1 | 9/2011 | Ricciulli | |
| 2014/0233401 A1* | 8/2014 | Jiang | H04W 64/00 |
| | | | 370/250 |

OTHER PUBLICATIONS

Written Opinion of the International Searching Authority dated Jul. 18, 2016, in PCT/EP2015/078203 filed Nov. 30, 2015.
Office Action dated Mar. 20, 2019 in European Patent Application No. 15 808 553.0.

* cited by examiner

DYNAMIC CONFIGURATION OF ROUTING PATHS IN A DATA NETWORK

BACKGROUND

Technical Field

The present invention generally relates to data networks. Specifically, the present invention concerns the selection and configuration of routing paths of data packets in a data network.

Overview of the Related Art

A data network comprises network apparatuses (network terminals, routers) that exchange data packets among themselves through communication links of the network (network links), along routing paths.

Adaptive routing protocols are known that are used for enabling the exchange of routing information used by the network apparatuses in order to calculate the optimal routing path of data packets through the network, and for reacting to changes in the network operating conditions. The routing information and the routing protocol need to be coherent in a homogeneous network, because, in a distributed fashion, every network apparatus must be capable to choose, coherently with the other network apparatuses, the network resources through which the data packets are to be routed to reach their destination.

Current distributed routing protocols are based on either static or dynamic information. In the case of use of static information, a network administrator assigns a cost to the network links between the routers, the cost being a value providing an indication of the probability that such a link has to be selected for routing a data traffic flow (in the context of this document, by "data traffic flow", or "data packets flow", or simply "flow" it is meant a flow or stream of data packets having common origin and common destination). In the case of use of dynamic information, the costs of the links are calculated dynamically by the routers based on the traffic load of the links.

When a data traffic flow has to be routed, each router, based on information about the data traffic flow like the destination router, calculates towards which intermediate router and over which network link the data packets are to be routed to approach the destination, following the routing path deemed to be better by the routing algorithms. The sequence of hops chosen by each intermediate router determines the complete routing path to the destination.

Irrespective of whether static or dynamic information are used, the choice of the routing path is made using information associated with the network links.

Due to the complexity of the distributed routing algorithms, in the practice only algorithms are deployed that exploit static information, i.e. not taking into account the actual load of the network resources and the performance that the network links can ensure. In this way, the routing algorithms respond properly and quickly to the occurrence of faults in the network, but are not able to cope with overload conditions possibly occurring in parts of the network, or with the decay of quality of the services associated with some data traffic flows.

In The Internet Engineering Task Force (IETF®) Request For Comments (RFC) 4655, A. Farrel et al.: "A Path Computation Element (PCE)-Based Architecture", August 2006, specifies the architecture for a Path Computation Element (PCE)-based model to address the problem of path computation in large, multi-domain networks. The document describes a set of building blocks for the PCE architecture from which solutions may be constructed. For example, it discusses PCE-based implementations including composite, external, and multiple PCE path computation.

SUMMARY OF THE PRESENT DISCLOSURE

The Applicant has perceived that currently used solutions relying on a distributed approach for calculating the routing paths of data packets in data networks are not satisfactory. Distributed routing algorithms that exploit dynamic information are too complex to be deployed on the network apparatuses. On the other hand, distributed routing algorithms that exploit static information are not able to cope with overload conditions possibly occurring in parts of the network, or with the decay of quality of the services associated with some data traffic flows.

The Applicant has found that a relatively recent approach to data networks, the so-called "Software-Defined Networking" or "SDN", enables new and more efficient ways of calculating the routing paths. According to the SDN approach, the implementation of the network control is no longer entrusted to the network apparatuses involved in the routing of data traffic, being instead transferred to a centralized network control system (one or more network controllers).

The Applicant has found that, following the SDN approach, both the routing algorithms and the information exploited for calculating the routing path are no longer distributed across the network apparatuses, being instead centralized in a network control system. Thus, the new solution herein disclosed is directed to data networks featuring a centralized network controller, like in the SDN approach, which is entrusted with data traffic flows routing functionalities (contrary to the known distributed routing algorithms). The network controller(s) instruct(s) the network nodes about how to route, through their different output ports, the received data packets.

In particular, the new solution herein disclosed calls for using end-to-end performance data related to the services associated with the data traffic flows routed through the data network across different routing paths. End-to-end performance data can be measured by probes on the network terminals that generate network traffic (network end points) and are collected by a centralized network system which, taking into account the collected end-to-end performance data of the different services and the routing information for the services available to the centralized network control system, feeds a routing algorithm with indications of the impact of the network resources on the end-to-end performance of the transported data traffic flows.

According to an aspect thereof, the solution herein disclosed proposes a method for selecting routing paths of data packets in a data network comprising a plurality of communication links and routing apparatuses. The method comprises:

- calculating and assigning to the communication links respective communication links' costs;
- calculating, for at least two different routing paths in the data network, each routing path being made up by at least one communication link, respective routing path overall costs, wherein the overall cost of a routing path depends on the communication links' costs assigned to the communication links making up such routing path;

selecting, among the at least two different routing paths, the routing path having the lower routing path overall cost;

causing a new data packet to be routed in the data network over the selected routing path, and collecting measures indicative of at least one performance parameter indicating a performance of previous transmissions of data packets from origin end points of the data network to destination end points of the data network, and using said collected measures for calculating said communication links' costs.

Said at least one performance parameter may include at least one of the following performance parameters:
end-to-end transfer time;
round-trip delay time;
end-to-end jitter;
variation in the round-trip delay time;
end-to-end data packet loss ratio;
round-trip data packet loss ratio.

In embodiments of the solution, said calculating and assigning to the communication links respective communication link costs may comprise:
comparing said measures indicative of at least one performance parameter with at least one respective performance parameter threshold value;
in case, for a previous transmission of data packets, said at least one performance parameter threshold value is trespassed, flagging said previous transmission of data packets;
counting the numbers of flagged previous transmission of data packets routed through same communication links;
assigning to the communication links respective communication link costs based on the respective counts of the numbers of flagged previous transmission of data packets routed through same communication links.

In embodiments of the solution, calculating and assigning to the communication links respective communication link costs may comprise:
comparing the numbers of flagged previous transmission of data packets routed through same communication links with at least one link inhibition threshold number;
in case, for a communication link, said at least one link inhibition threshold number is trespassed, assigning to such communication link a predefined maximum communication link cost.

In embodiments of the solution, said comparing said measures indicative of at least one performance parameter with at least one respective performance parameter threshold value may comprise:
comparing said measures indicative of at least one performance parameter with at least a warning performance parameter threshold value and a criticality performance parameter threshold value;
in case, for a previous transmission of data packets, said warning performance parameter threshold value is trespassed but said criticality performance parameter threshold value is not trespassed, flagging said previous transmission of data packets with a first flag;
in case, for a previous transmission of data packets, said criticality performance parameter threshold value is trespassed, flagging said previous transmission of data packets with a second flag;
counting the numbers of flagged previous transmissions of data packets flagged with the first flag routed through same communication links;
counting the numbers of flagged previous transmissions of data packets flagged with the second flag routed through same communication links;
assigning to the communication links respective communication links' costs based on the respective counts of the numbers of flagged previous transmission of data packets flagged with the first flag and flagged with the second flag and routed through same communication links.

Said assigning to the communication links respective communication links' costs based on the respective counts of the numbers of flagged previous transmission of data packets flagged with the first flag and flagged with the second flag and routed through same communication links may for example comprise:
calculating first ratios between the numbers of flagged previous transmissions of data packets flagged with the first flag routed through same communication links and overall numbers of previous transmissions of data packets routed through said same communication links;
calculating second ratios between the numbers of flagged previous transmissions of data packets flagged with the second flag routed through same communication links and said overall numbers of previous transmissions of data packets routed through said same communication links;
assigning to the communication links (123) respective communication link costs based on said first ratios and said second ratios.

In embodiments of the solution, said comparing the numbers of flagged previous transmission of data packets routed through same communication links with at least one threshold number comprises comparing the second ratios with said at least one threshold number, and in case, for a communication link, said at least one link inhibition threshold number is trespassed, assigning to such communication link the predefined maximum communication link cost.

Preferably, said using the collected measures for calculating said communication links' costs may comprise:
obtaining topological data regarding the data network and the resources thereof used for the routing of the previous transmissions of data packets from the origin end points of the data network to the destination end points of the data network.

Preferably, said collecting measures indicative of at least one performance parameter may comprise collecting measures indicative of at least two different performance parameters each indicating a performance of previous transmissions of data packets, and said calculating and assigning to the communication links respective communication links' costs comprises, for each communication link, summing at least two link cost contributions, each link cost contribution being based on the collected measures of a respective one of said at least two different performance parameters, each link cost contribution being preferably weighted by a respective weight.

According to another aspect thereof, the solution herein disclosed proposes a system for selecting routing paths of data packets in a data network comprising a plurality of communication links and routing apparatuses, wherein the routing paths are each made up by at least one communication link. The system comprises:
a measure collector operable to collect measures indicative of at least one performance parameter indicating a performance of previous transmissions of data packets from origin end points of the data network to destination end points of the data network;

a links' costs calculator operable to use said collected measures for calculating said communication links' costs and for assigning the calculated links costs' to the communication links;

a network controller operable to:
  use the calculated links' costs for calculating, for at least two different routing paths in the data network, respective routing path overall costs, wherein the overall cost of a routing path depends on the communication links' costs assigned to the communication links making up such routing path,
  select, among the at least two different routing paths, the routing path having the lower routing path overall cost, and
  cause a new data packet to be routed in the data network over the selected routing path.

In embodiments of the solution, said measure collector may be operable to collect said measures of the at least one performance parameter including at least one of the following performance parameters:
  end-to-end transfer time;
  round-trip delay time;
  end-to-end jitter;
  variation in the round-trip delay time;
  end-to-end data packet loss ratio;
  round-trip data packet loss ratio.

In embodiments of the solution, said links' costs calculator may be operable to calculate and assign to the communication links respective communication link costs by:
  comparing said measures indicative of at least one performance parameter with at least one respective performance parameter threshold value;
  in case, for a previous transmission of data packets, said at least one performance parameter threshold value is trespassed, flagging said previous transmission of data packets;
  counting the numbers of flagged previous transmission of data packets routed through same communication links;
  assigning to the communication links respective communication link costs based on the respective counts of the numbers of flagged previous transmission of data packets routed through same communication links.

In embodiments of the solution, said links' costs calculator may be operable to calculate and assign to the communication links respective communication link costs by:
  comparing the numbers of flagged previous transmission of data packets routed through same communication links with at least one link inhibition threshold number;
  in case, for a communication link, said at least one link inhibition threshold number is trespassed, assigning to such communication link a predefined maximum communication link cost.

Preferably, for said comparing said measures indicative of at least one performance parameter with at least one respective performance parameter threshold value, the links' costs calculator may be operable to:
  compare said measures indicative of at least one performance parameter with at least a warning performance parameter threshold value and a criticality performance parameter threshold value;
  in case, for a previous transmission of data packets, said warning performance parameter threshold value is trespassed but said criticality performance parameter threshold value is not trespassed, flag said previous transmission of data packets with a first flag;
  in case, for a previous transmission of data packets, said criticality performance parameter threshold value is trespassed, flag said previous transmission of data packets with a second flag;
  count the numbers of flagged previous transmissions of data packets flagged with the first flag routed through same communication links;
  count the numbers of flagged previous transmissions of data packets flagged with the second flag routed through same communication links;
  assign to the communication links respective communication links' costs based on the respective counts of the numbers of flagged previous transmission of data packets flagged with the first flag and flagged with the second flag and routed through same communication links.

In embodiments of the solution, for said assigning to the communication links respective communication links' costs based on the respective counts of the numbers of flagged previous transmission of data packets flagged with the first flag and flagged with the second flag and routed through same communication links, the links' costs calculator may be operable to:
  calculate first ratios between the numbers of flagged previous transmissions of data packets flagged with the first flag routed through same communication links and overall numbers of previous transmissions of data packets routed through said same communication links;
  calculate second ratios between the numbers of flagged previous transmissions of data packets flagged with the second flag routed through same communication links and said overall numbers of previous transmissions of data packets routed through said same communication links;
  assign to the communication links respective communication link costs based on said first ratios and said second ratios.

In embodiments of the solution, for said comparing the numbers of flagged previous transmission of data packets routed through same communication links with at least one threshold number, the links' costs calculator may be operable to compare the second ratios with said at least one threshold number, and in case, for a communication link, said at least one link inhibition threshold number is trespassed, assign to such communication link the predefined maximum communication link cost.

Preferably, the links' costs calculator is operable to use the collected measures for calculating said communication links' costs by:
  obtaining topological data regarding the data network and the resources thereof used for the routing of the previous transmissions of data packets from the origin end points of the data network to the destination end points of the data network.

In embodiments of the solution, the measure collector may be operable to collect measures indicative of at least two different performance parameters each indicating a performance of previous transmissions of data packets, and said links' costs calculator is operable to calculate and assign to the communication links respective communication links' costs by summing, for each communication link, at least two link cost contributions, each link cost contribution being based on the collected measures of a respective one of said at least two different performance parameters, each link cost contribution being preferably weighted by a respective weight.

BRIEF DESCRIPTION OF THE DRAWINGS

In the following, exemplary and non-limitative embodiments of the solution herein disclosed will be described in a certain detail, referring to the attached drawings for a better intelligibility, wherein.

DETAILED DESCRIPTION OF EMBODIMENTS OF THE SOLUTION DISCLOSED HEREIN

Figure 1:
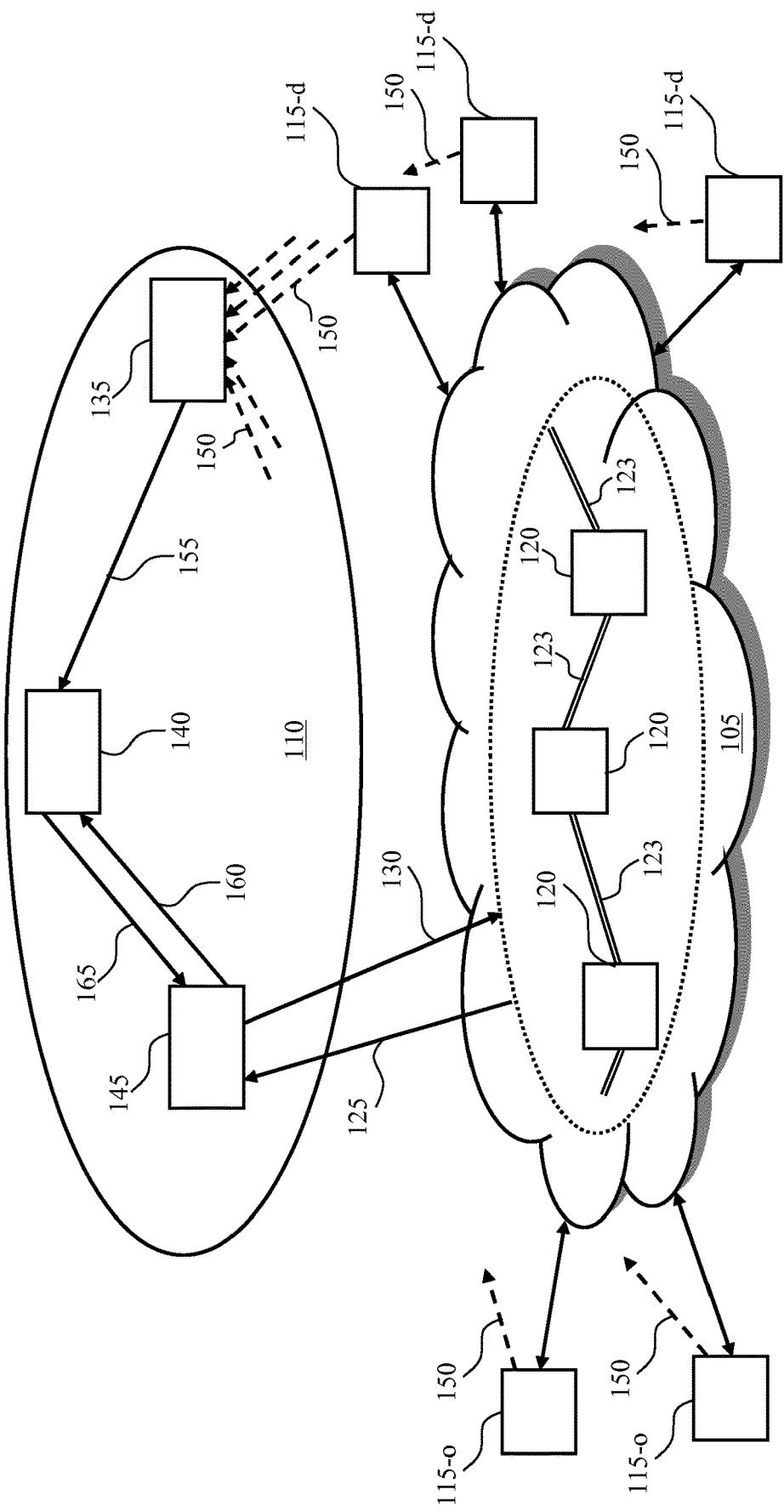
FIG. 1 schematically depicts an architecture of a system including a centralized network controller, according to an embodiment of the solution herein disclosed.

In FIG. 1, an architecture according to an embodiment of the solution disclosed herein is schematically depicted.

Reference numeral 105 denotes a data network, e.g. a Local Area Network (LAN), a Metropolitan Area Network (MAN), a Wide Area Network (WAN). Reference numeral 110 denotes a centralized network controller, e.g. an SDN network controller, i.e. a network controller according to the SDN approach.

Reference numeral 115 identifies network end points, intended as network nodes located at the boundary of the data network 105, e.g. network terminals (for example: Personal Computers, connected to the data network 105, e.g. via Ethernet connections, via broadband connections like xDSL connections, through xDSL modems, or optical fiber connections; mobile phones, smartphones, tablets, connected to the data network 105 through a mobile telephony network like a 3G or 4G mobile network). The network end points 115 include data traffic-generating end points (origin end-points) 115-o, i.e. network end points (e.g. terminals) that generate data traffic, and data traffic destination end points 115-d, which are the destination of the data traffic generated by the traffic-generating end points. Typically, although not exclusively, network end point apparatus can act both as data traffic-generating end points and as data traffic destination end points.

Reference numeral 120 globally identifies intermediate routers in the data network 105, that route the data traffic over network links 123 from the traffic-generating end points 115-o towards the destination end points 115-d. Generally, the routing of data traffic envisages a plurality of hops from the origin end-point to one intermediate router then to another intermediate router and so on, till the intended destination end point is reached.

According to the solution herein disclosed, the network controller 110 receives from the routers 120 and manages routing information requests 125 and, in response, provides to the routers 120 routing information 130 for routing data traffic (data packets) from the origin end points 115-o to the destination end points 115-d. The routing information 130 provided by the network controller 110 to the routers 120 is based on measures 150 of end-to-end performance parameters of the services provided (transported) over the data network 105, which measures are in particular obtained (by means of probes) from the origin and destination end points 115-o and 115-d, as described in greater detail in the following.

In an embodiment of the solution disclosed herein, the centralized network controller 110 comprises three interoperating functional entities or modules or, simply, functions: a measure collector entity 135, an end-flow functional entity (links' costs calculator) 140 and a network controller entity 145. The functions of the centralized network controller 110 may be implemented in hardware, in software (by means of algorithms executed by a possibly distributed programmable data processor) or partly in hardware and partly in software.

The measure collector entity 135 and the end-flow calculator functional entity 140 operate preferably in background, preferably with a certain (possibly predefined) time periodicityp (e.g., 10 minutes), and calculate parameter values corresponding to technical burdens experienced in using each different link or, shortly, "costs" of the different links 123 of the data network 105. The links' costs are calculated based on the measures 150 of the end-to-end performance parameters obtained from the origin and destination end points 115-o and 115-d, considering data traffic flows active (i.e., transported through the data network 105) during the considered time period p.

Figure 2:
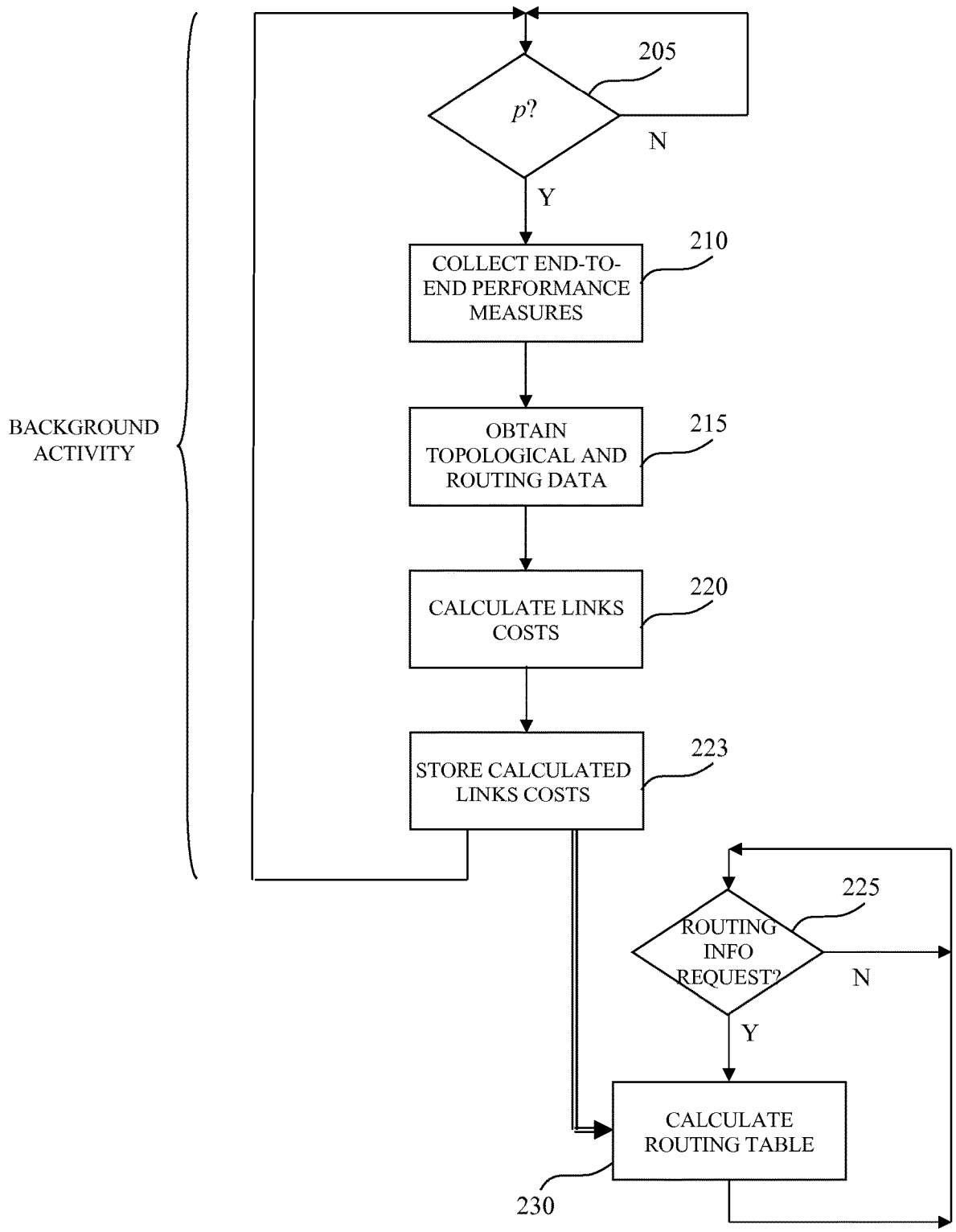
FIG. 2 is a schematic flowchart showing how the system of FIG. 1 works.

In particular, in the exemplary embodiment considered herein as depicted in the schematic flowchart of FIG. 2, every time period p (block 205) (e.g., every 10 minutes) the measures 150 of the end-to-end performance parameters made by the network end points 115 during such time period p are collected by the measure collector entity 135 (block 210).

Figure 3:
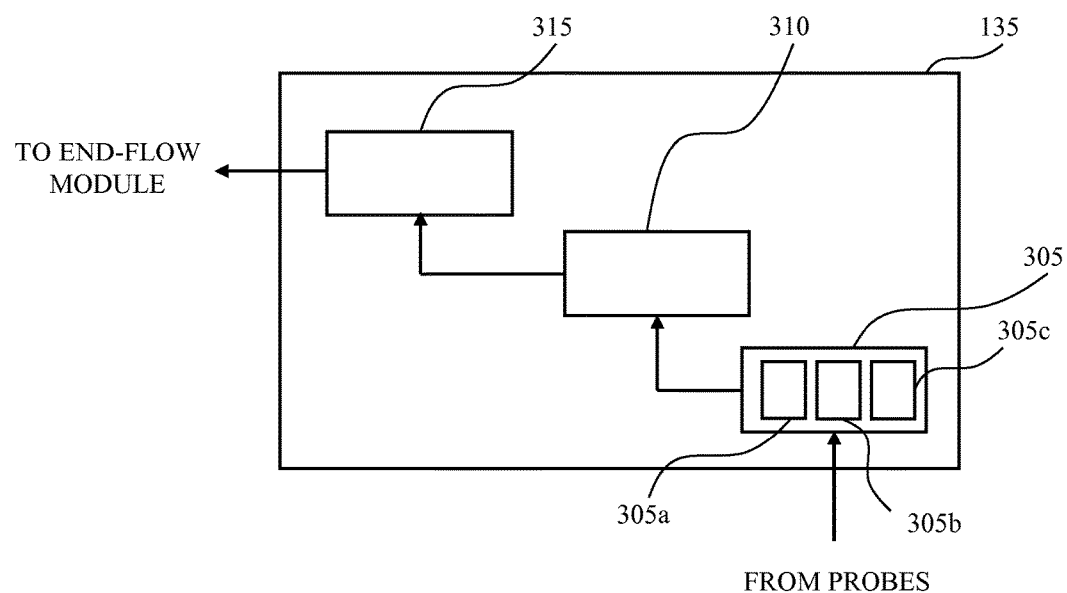
FIG. 3 schematically shows, in terms of functional blocks, the structure of a module of the centralized network controller, according to an embodiment of the solution herein disclosed.

The measure collector entity 135, as schematically depicted in FIG. 3, comprises a measure collecting module 305, configured to collect the measures of the end-to-end performance parameters from probes in the data network, in particular located at the network end points 115. The measure collector module 305 may comprise measure collecting sub-modules 305a, 305b, 305c entrusted with the task of collecting each the measures of one specific end-to-end performance parameter, as better described in the following. Optionally, the measure collector entity 135 can comprise a measures pre-processor module 310, configured to pre-process the collected end-to-end performance parameters measures and/or enrich the collected end-to-end performance parameters measures before passing them to the end-flow entity 140. For instance, the probes generating the measures of the end-to-end performance parameters may not be located exactly at the end points 115 of the data network 105 controlled by the end-flow entity 140; in such cases, a suitable algorithm should be executed to estimate, from the measures collected from the probes, the measures that would have been generated if the probes were located in the end points. The end-to-end performance parameters measures collected by the measure collector module 305 (possibly pre-processed by the measure pre-processor module 310) are passed to a communicator module 315 that communicates with the end-flow entity 140.

Techniques for collecting the end-to-end performance parameters measures 150 from the network end points 115 may depend on the type of the data network 105. For example, for Ethernet LANs and WANs the Metro Ethernet Forum (MEF) has defined a performance monitoring protocol based on the ITU-T Recommendation Y1731 that is supported by almost every new-generation network apparatus and that enables precisely detecting parameters relevant to the characterization of the end-to-end performance of the transmission of data traffic flows, such as the delay, the jitter and the packet loss ratio of the transmitted data traffic flows.

Back to the flowchart of FIG. 2, the measure collector entity 135 transfers 155 the collected (and, possibly, pre-processed) end-to-end performance parameters measures to the end-flow entity 140 (block 210).

Figure 4:
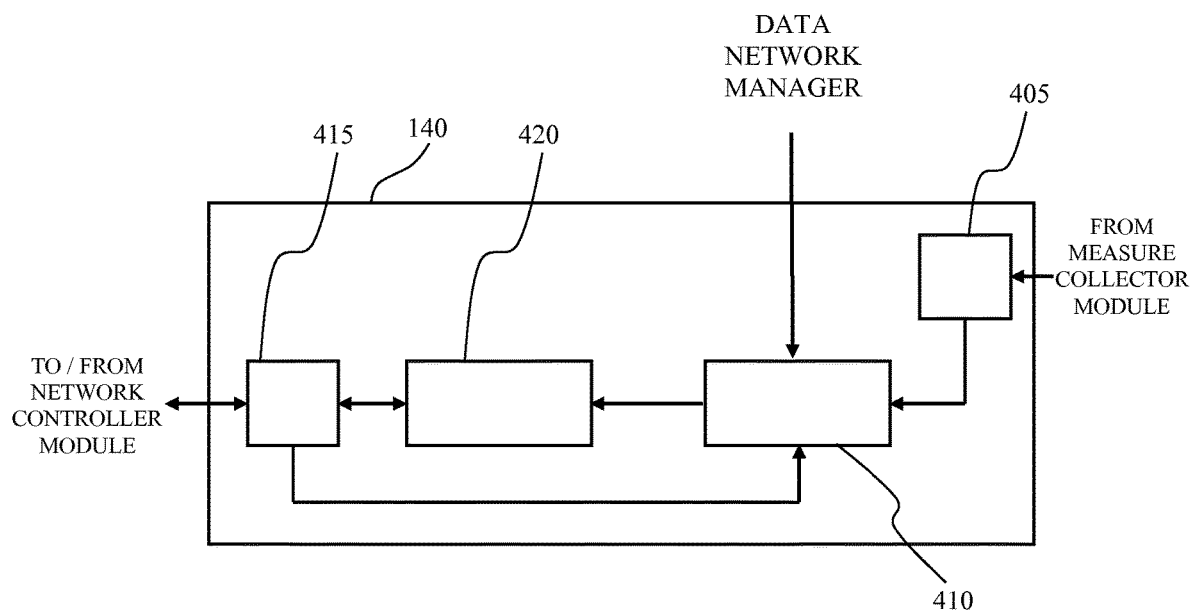
FIG. 4 schematically shows, in terms of functional blocks, the structure of another module of the centralized network controller, according to an embodiment of the solution herein disclosed.

The end-flow entity 140, as schematically depicted in FIG. 4, comprises a communicator module 405 for communicating with the measure collector entity 135 and receiving therefrom the end-to-end performance parameters measures. The end-to-end performance parameters measures are fed to a links' costs calculator module 410, configured for calculating costs to be associated to the links 123 of the data network 105, as described in detail subsequently. For calculating the links' costs, the links' costs calculator module 410 exploits the end-to-end performance parameters measures and network topological data obtained from the network controller entity 145, with which the end-flow entity 140 communicates via a communicator module 415. The end-flow entity 140 has a data storage unit 420 where the calculated links' costs are stored.

Back to the flowchart of FIG. 2, every time period p, the end-flow entity 140 obtains (block 215) from the network controller entity 145 topological data 160 regarding the data network 105 and the resources thereof used for the routing of the data traffic flows active during the time period p and in respect of which the end-to-end performance parameters measures are available. The end-flow entity 140 then calculates (block 220) the costs of the different links 123 of the data network 105, based on the collected end-to-end performance measures 150, stores (block 223) in the data storage unit 420 the calculated links' costs, to be ready to be provided to the network controller entity 145. The links costs, being periodically re-calculated and stored (blocks 220 and 223), change dynamically to track changes in the data network operating conditions.

Figure 5:
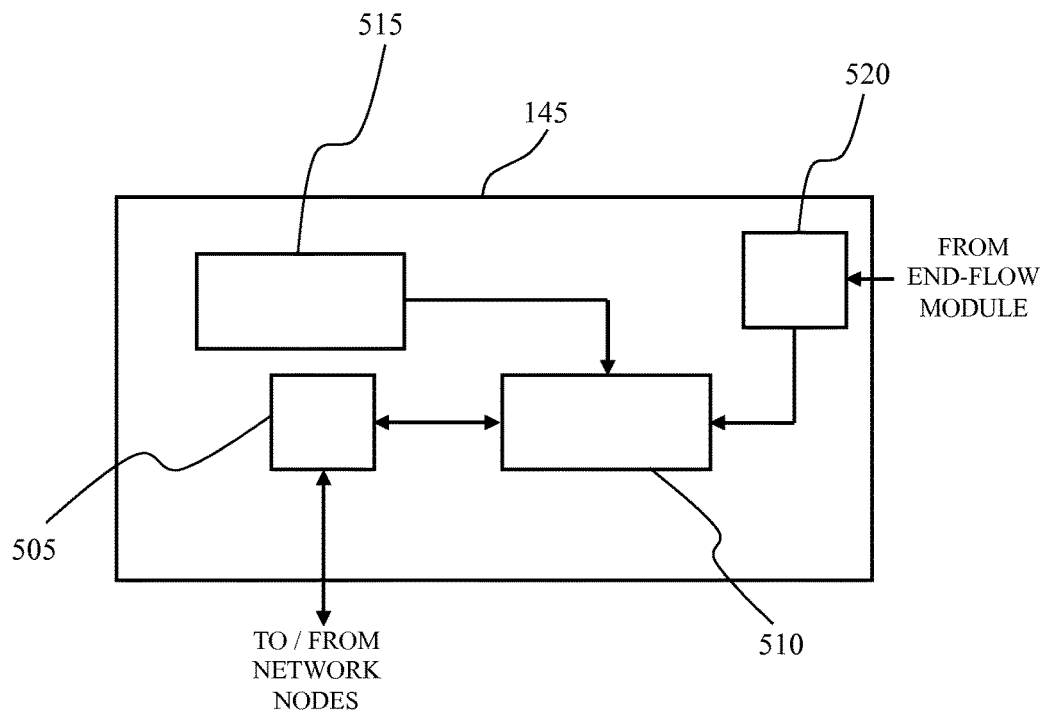
FIG. 5 schematically shows, in terms of functional blocks, the structure of still another module of the centralized network controller, according to an embodiment of the solution herein disclosed.

The network controller entity 145, as schematically depicted in FIG. 5, comprises a routing requests manager module 505, configured for managing routing requests 125 received from the routers 120. A routing table calculator module 510 calculates routing tables based on the network topological data 515 and the links' costs stored in the data storage unit 420, with which the network controller entity 145 communicates via a communicator module 520.

The network controller entity 145 responds to routing information requests 125 from the routers 120 (block 225). The routers 120 request routing information to the centralized network controller 110 when they have to route through the data network 105 a new data traffic flow (i.e., a data traffic flow not previously existing, i.e. not previously active). Responsive to a routing information request 125, the network controller entity 145 calculates (block 230) the routing table for the new data traffic flow to be routed, based on the stored links' costs provided thereto by the end-flow entity 140, and then provides the routing table information 130 to the routers 120. The network controller entity 145 calculates the routing tables based for example on a criterion of selecting a routing path of minimum cost among all the possible paths in a graph representing the network apparatuses (routers 120) and the network links 123 with associated links' costs.

In greater detail, in an embodiment the end-flow entity 140 operates as follows.

For every active data traffic flow F in the data network 105, at the end of the time period p, the measure collector entity 135 provides to the end-flow entity 140 the following information:

Measure of the end-to-end transfer time $t_F$ of the considered active data traffic flow F. The end-to-end transfer time (or end-to-end delay, or one-way delay) $t_F$ of the considered active data traffic flow is the time taken for the data packets of the considered active data traffic flow F to go from the respective origin end point 115-$o$ to the respective destination end point 115-$d$; thus, the end-to-end transfer time refers to the time taken for a packet to be transmitted across the data network 105 from the source to the destination. In alternative (or in addition) to the measure of the end-to-end transfer time, the measure of the Round-Trip Delay time (RTD, also known as Round-Trip Time RTT) can be used, being the time taken by a signal to be sent plus the time taken for an acknowledgment of that signal to be received; thus, the RTD (or RTT) consists of the propagation times between the two points of a signal.

Measure of the Packet Delay Variation (PDV), hereinafter referred to as end-to-end jitter $j_F$. The end-to-end jitter $j_F$ is the variation in the end-to-end transfer time as measured in the variability over time of the packet latency across the data network 105. Packet jitter is expressed as an average of the deviation from the data network mean latency. In alternative (or in addition) to the measure of the end-to-end jitter $j_F$, it is possible to use the measure of the variation in the Round-Trip Delay time RTD.

Measure of the end-to-end data packet loss, hereafter called end-to-end data packet loss ratio $p_F$. Packet loss occurs when one or more packets of data travelling across a computer network fail to reach their destination. Packet loss is typically caused by network congestion. Packet loss is measured as a percentage of packets lost with respect to packets sent. The end-to-end data packet loss ratio $p_F$ is therefore the measure, as a percentage, of data packets lost with respect to sent data packets. Packet loss ratio can be measured either from the origin end point to the destination end point (end-to-end data packet loss ratio) or from the origin end point to the destination end point and back again to the origin end point (round trip data packet loss ratio).

Which are the end points (origin end point, destination end point) of the considered active data traffic flow F, e.g. identified by the IP addresses of the origin and destination end points 115-$o$ and 115-$d$ for the considered active data traffic flow F;

Preferably, an indication of the Class Of Service (COS) $COS_F$ to which the service transported by the considered active data traffic flow F belongs. Indeed, the data network 105 owner/operator may sell to the customers services of different nature (for example, data transfer, voice, videoconference, mission-critical data transfer, gaming), with different requirements (e.g., different priorities); the COS $COS_F$ specifies the nature (and thus the specific requirements) of the service transported by the active data traffic flow F.

From the network controller entity 145, the end-flow entity 140 obtains the network topological data, i.e. the information about which links 123 of the data network 105 are being used for routing the active data traffic flow F.

For calculating the links' costs, the end-flow entity 140 exploits (at least one) comparison threshold(s) (performance parameter threshold values) with which the measures of the end-to-end performance parameters are compared. Preferably, the values of the comparison thresholds are differentiated for the different classes of service COS. For example, for a generic active data traffic flow F, and for each considered end-to-end performance parameter, a warning threshold value and a criticality threshold value are exploited; for example, the following thresholds values are exploited:

a warning threshold value $ThWT_{COS,F}$ for the end-to-end transfer time $t_F$;

a warning threshold value $ThWJ_{COS,F}$ for the end-to-end jitter $j_F$;

a warning threshold value $ThWP_{COS,F}$ for the end-to end data packet loss ratio $p_F$;

a criticality threshold value $ThCT_{COS,F} > ThWT_{COS,F}$ for the end-to-end transfer time $t_F$;

a criticality threshold value $ThCJ_{COS,F} > ThWJ_{COS,F}$ for the end-to-end jitter $j_F$;

a criticality threshold value $ThCP_{COS,F} > ThWP_{COS,F}$ for the end-to end data packet loss ratio $p_F$;

Also, for calculating the links' costs, the end-flow entity 140 exploits (at least one) link inhibition threshold(s) (the link inhibition thresholds are for example expressed as numbers):

an inhibition threshold number $FLThT_{COS}$ ("Forbidden Link Threshold on Transmission Time") for inhibiting a link 123 due to excessive transmission time;

an inhibition threshold number $FLThJ_{COS}$ ("Forbidden Link Threshold on Jitter") for inhibiting a link 123 due to excessive jitter;

an inhibition threshold number $FLThP_{COS}$ ("Forbidden Link Threshold on Packet loss ratio") for inhibiting a link 123 due to excessive data packets losses.

Similar performance parameter thresholds and inhibition thresholds can be exploited in case the measures of the Round Trip Delay time RTD, the variation in the Round-Trip Delay time RTD, the round trip data packet loss ratio are used.

The warning thresholds $ThWT_{COS,F}$, $ThWJ_{COS,F}$, $ThWP_{COS,F}$ allows distributing the data traffic over the data network resources uniformly.

The warning thresholds can be defined individually for any specific data traffic flow F, and thus the warning thresholds depend on the specific COS $COS_F$ of the specific data traffic flow,. In this case, the warning thresholds may have static numeric values, for example defined and set by a data network manager (intended as a person or team of persons administering the data network 105) and made available to the end-flow entity 140 (as schematically depicted in FIG. 4). The static warning thresholds only depend on the COS and are equal for the whole data network 105; in this way the end-flow entity 140, in calculating the links' costs, puts first the end-to-end quality of the service offered to the end users.

Alternatively, as in the example here considered, the values of the warning thresholds may also depend on the network resources used for routing the data packets of the considered data traffic flow; in this case, every warning threshold is calculated dynamically, based on the routing of the specific data traffic flow F to which such warning threshold relates; the warning thresholds have values depending on the number and the type of network resources through which the data packets of the considered data traffic flow F pass. In this way, the end-flow entity 140, in calculating the links costs, puts first the distribution of the traffic over the data network, promoting a more homogeneous network use. The criticality thresholds, in combination with the inhibition thresholds, in addition to allowing to distribute the data traffic over the data network resources similarly to the warning thresholds, allow inhibiting the selection (for the determination of the routing path) of those network links that negatively affect the measured end-to-end performance parameters, i.e. those links that are (at a certain time) excessively loaded.

Figure 6:
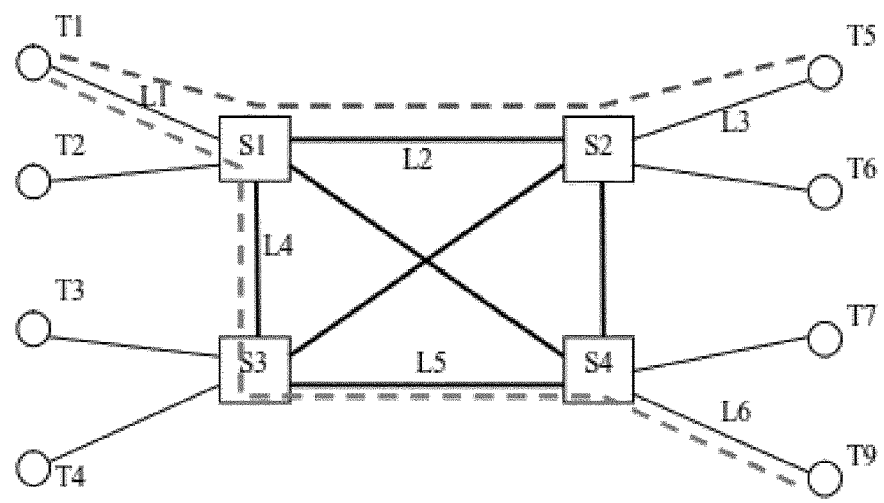
FIG. 6 shows an example of how thresholds are calculated that are used for classifying data traffic flows.

The dynamic calculation of the warning, criticality and inhibition thresholds is for example performed by the end-flow entity 140, which, as a function of the routing path of a considered active data traffic flow F, sums up a minimal contribution in respect of every network resource through which the considered active data traffic flow F passes, thereby obtaining a nominal minimal value of the measure performed on a certain routing path; a margin contribution ($T_{marg}$) is preferably added to the nominal minimal value (preferably, different margin contributions $T_{margW}$ and $T_{margC}$ are used for the calculation of the warning and criticality thresholds). FIG. 6 schematizes an example of how the warning and criticality thresholds are calculated: T1-T9 represent network end points 115, S1-S4 represent network routers 120, L1-L6 represent links 123; two routing paths are considered: a first routing path from the origin end point T1 to the destination end point T5 and passing through the links L1, L2 and L3, and a second routing path from the origin end point T1 to the destination end point T9 and passing through the links L1, L4, L5 and L6. Let $t_r$ be the measured end-to-end transfer time of a first active data traffic flow routed along the first routing path, and $t_v$ be the measured end-to-end transfer time of a second active data traffic flow routed along the second routing path. The nominal end-to-end transfer time of the first data traffic flow is $tn_r = t_{L1} + t_{L2} + t_{L3}$, that of the second data traffic flow is $tn_v = t_{L1} + t_{L4} + t_{L5} + t_{L6}$. The warning threshold value $ThWT_{COS,F}$ for the first data traffic flow is $ThWT_r = tn_r + T_{margW}$, that for the second data traffic flow is $ThWT_v = tn_v + T_{margW}$. The criticality threshold value $ThCT_{COS,F}$ for the first data traffic flow is $ThCT_r = tn_r + T_{margC}$, that for the second data traffic flow is $ThCT_v = tn_v + T_{margC}$.

The criticality thresholds, in combination with the inhibition thresholds, in addition to allowing to distribute the data traffic over the data network resources similarly to the warning thresholds, allow inhibiting the selection (for the determination of the routing path of a new data traffic flow) of those network links 123 that negatively affect the measured end-to-end performance parameters, i.e. those links that are (at a certain time) excessively loaded.

Considering for the sake of simplicity only the measures of the data traffic flow end-to-end transfer times $t_F$, according to an embodiment of the solution herein disclosed the end-flow entity 140 calculates the links costs as follows (similar operations can be performed in respect of other end-to-end performance parameters measures, particularly the measures of the end-to-end jitter and of the end-to-end packet loss ratio).

For each active data traffic flow end-to-end transfer time measure $t_F$, the origin and destination end points are identified, e.g. by their IP addresses. The end-flow entity 140, by interrogating the network controller entity 145, can reconstruct the routing path, in terms of links 123, followed by the considered active data traffic flow F to which that end-to-end transfer time measure $t_F$ relates.

By comparing the end-to-end transfer time measure $t_F$ to the warning threshold value $ThWT_{COS,F}$ and the criticality threshold value $ThCT_{COS,F}$ for the end-to-end transfer time, the end-flow entity 140 is able to determine, for the considered active data traffic flow F:

if $t_F < ThWT_{COS,F}$: the transfer of the data packets of the data traffic flow F took place without problems;

if $ThWT_{COS,F} < t_F < ThCT_{COS,F}$: some congestion problems took place during the transfer of the data packets of the data traffic flow F; the data traffic flow F status is marked as "warning";

if $t_F > ThCT_{COS,F}$: serious congestion problems took place during the transfer of the data packets of the data traffic flow F; the data traffic flow F status is marked as "critical".

The end-flow entity 140 classifies (and accordingly flags) the active data traffic flows as being in "warning" (first flag) or "critical" (second flag) status for all the measured end-to-end performance parameters (e.g., end-to-end transfer time $t_F$, end-to-end jitter $j_F$, end-to-end data packet loss ratio $p_F$), by comparison with the respective warning and criticality threshold values, and calculates how many active data traffic flows are transported by each network link 123. An exemplary procedure is that of the following pseudo-code.

At the end of every time period p, for every active data traffic flow F routed through the data network 105, known the COS of every data traffic flow:

```
if (t_F > ThWT_COS,F) { // End-to-end transfer time measure
    if (t_F > ThCT_COS,F) { // Is measured end-to-end transfer time critical?
        for (each link L over which data traffic flow F is transported) {
            NCT_L,COS = NCT_L,COS + 1
        }
    } else { // Measured end-to-end transfer time is in warning
        for (each link L over which data traffic flow F is transported) {
            NWT_L,COS = NWT_L,COS + 1
        }
    }
}
if (j_F > ThWJ_COS,F) { // End-to-end jitter measure
    if (j_F > ThCJ_COS,F) { // Is measured End-to-end Jitter measure critical?
        for (each link L over which data traffic flow F is transported) {
            NCJ_L,COS = NCJ_L,COS + 1
        }
    } else { //Measured end-to-end Jitter measure is in warning
        for (each link L over which data traffic flow F is transported) {
            NWJ_L,COS = NWJ_L,COS + 1
        }
    }
}
if (p_F > ThWP_COS,F) { // End-to-end packet loss ratio measure
    if (p_F > ThCP_COS,F) { // Is measured end-to-end packet loss ratio critical?
        for (each link L over which data traffic flow F is transported) {
            NCP_L,COS = NCP_L,COS + 1
        }
    } else { // Measured end-to-end packet loss ratio is in warning
        for (each link L over which data traffic flow F is transported) {
            NWP_L,COS = NWP_L,COS + 1
        }
    }
}
// Increment counter of the overall number of data traffic flows routed
through a routing path including the link L and having a certain COS
for (each link L over which data traffic flow F is transported) {
    N_L,COS = N_L,COS +1
}
``` where:

$NWT_{L,COS}$ is a counter of the number of active data traffic flows in "warning" state for the measured end-to-end transmission time, routed through a routing path including the link L and having a certain COS;

$NCT_{L,COS}$ is a counter of the number of active data traffic flows in "critical" state for the measured end-to-end transmission time routed through a routing path including the link L and having a certain COS;

$NWJ_{L,COS}$ is a counter of the number of active data traffic flows in "warning" state for the measured end-to-end jitter routed through a routing path including the link L and having a certain COS;

$NCJ_{L,COS}$ is a counter of the number of active data traffic flows in "critical" state for the measured end-to-end jitter routed through a routing path including the link L and having a certain COS;

$NWP_{L,COS}$ is a counter of the number of data traffic flows in "warning" state for the measured end-to-end packet loss ratio routed through a routing path including the link L and having a certain COS;

$NCP_{L,COS}$ is a counter of the number of data traffic flows in "critical" state for the measured end-to-end packet loss ratio routed through a routing path including the link L and having a certain COS;

$N_{L,COS}$ is a counter of the overall number of data traffic flows routed through a routing path including the link L and having a certain COS.

Referring to the example of FIG. 6, being $t_r$ and $t_v$ the measured end-to-end transmission times of the exemplary first and second active data traffic flows, respectively, the first active data traffic flow is classified as "warning" if $ThWT_{COS,r} < t_r < ThCT_{COS,r}$, whereas it is classified as "critical" if $t_r > ThCT_{COS,r}$. Similarly, the second active data traffic flow is classified as "warning" $ThWT_{COS,v} < t_v < ThCT_{COS,r}$, whereas it is classified as "critical" if $t_v > ThCT_{COS,v}$.

Having available a sufficiently high number of active data traffic flows transported through the data network 105, each active data traffic flow being transported along a respective routing path (i.e., succession of links 123) from the origin to the destination end points 115-$o$, 115-$d$, and associating to each active data traffic flow a respective flag indicating if such active data traffic flow is in "warning" state or in "critical" state (or otherwise in "normal" state, if not in "warning" nor in "critical" state), it is possible to assign to each network link, and for each end-to-end performance parameter, two dynamically-changing indicators (whose values change with periodicity p) for each COS, indicating the number of active data traffic flows, belonging to such COS, in "warning" state and the number of active data traffic flows in "critical" state that passed through said link in the considered time period p. For example, considering the three end-to-end performance parameters defined in the foregoing, the following three couples of dynamically-changing indicators are assigned to the generic network link L for the generic COS: [$NWT_{L,COS}$, $NCT_{L,COS}$], [$NWJ_{L,COS}$, $NCJ_{L,COS}$], [$NWP_{L,COS}$, $NCP_{L,COS}$].

The link cost to be assigned to each link 123 of the data network 105 can then be computed based, for each performance parameter, on said number of active data traffic flows in "warning" state and said number of active data traffic flows in "critical" state that passed through said link in the considered time period p. The determination of the active data flows that passed through the different links is done based on routing information and topological information available to the network controller 110, as described above. Preferably, a link cost is calculated for each class of service.

In particular, after having classified the different active data traffic flows as in "warning" or in "critical" state in relation to a single performance parameter (or otherwise in "normal" state, if not in "warning" nor in "critical" state), for each link 123 of the data network two ratios are calculated: a first ratio is the percentage of active data traffic flows in "warning" state compared to the overall number of active data traffic flows that passed through the considered link, a second ratio is the percentage of active data traffic flows in "critical" state compared to the overall number of active data traffic flows that passed through the considered link. This two ratios are used for calculating the link cost.

In particular, for each network link (and preferably for each COS), two ratios are calculated, for each of the measured end-to-end performance parameters.

Considering for example the measures of the data traffic flow end-to-end transfer times, two ratios are calculated for each link and each COS: $WLRT_{L,COS}$ (Warning Link Ratio on Transmission Time, for link L and COS COS) and $CLRT_{L,COS}$ (Critical Link Ratio Ratio on Transmission Time, for link L and COS COS). The ratio $WLRT_{L,COS}$ is calculated taking account of the active data traffic flows of the class of service COS that passed through the link L and classified as in "warning" state in respect of the measured end-to-end transmission time:

$$WLRT_{L,COS} = NWT_{L,COS}/N_{L,COS}.$$

The ratio $CLRT_{L,COS}$ is calculated taking account of the active data traffic flows of the class of service COS that passed through the link L and classified as in "critical" state in respect of the measured end-to-end transmission time:

$$CLRT_{L,COS} = NCT_{L,COS}/N_{L,COS}.$$

Similar couples of ratios are calculated, for each link and each COS, considering the other measured end-to-end performance parameters, in the example herein considered the end-to-end jitter and the end-to-end packet loss ratio, i.e.:

$WLRJ_{L,COS}$ (Warning Link Ratio on Jitter): ratio of the data traffic flows in "warning" state, in respect of the measured end-to-end jitter, to the overall number of data traffic flows (for the link L and the COS COS):

$$WLRA_{COS} = NWJ_{L,COS}/N_{L,COS};$$

$CLRJ_{L,COS}$ (Critical Link Ratio on Jitter): ratio of the data traffic flows in "critical" state, in respect of the measured end-to-end jitter, to the overall number of data traffic flows (for the link L and the COS COS):

$$CLRJ_{L,COS} = NCJ_{L,COS}/N_{L,COS};$$

$WLRP_{L,COS}$ (Warning Link Ratio on Packet Loss ratio): ratio of the data traffic flows in "warning" state, in respect of the measured end-to-end packet loss ratio, to the overall number of data traffic flows (for the link L and the COS COS):

$$WLRP_{L,COS} = NWP_{L,COS}/N_{L,COS};$$

$CLRP_{L,COS}$ (Critical Link Ratio on Packet Loss ratio): ratio of the data traffic flows in "critical" state, in respect of the measured end-to-end packet loss ratio, to the overall number of data traffic flows (for the link L and the COS COS):

$$CLRP_{L,COS} = NCP_{L,COS}/N_{L,COS}.$$

It is then checked whether the ratio $CLRT_{L,COS}$ exceeds a predetermined threshold $FLThT_{COS}$, setting the maximum tolerable percentage of data traffic flows (of the class of service COS) in "critical" state as far as the end-to-end transfer time is considered (e.g., 80%, i.e. $FLThT_{COS}=0.8$). If the ratio $CLRT_{L,COS}$ exceeds a predetermined threshold $FLThT_{COS}$, then a predetermined cost value CFL is assigned to such a link, wherein the cost value CFL is a cost value identifying the link as "forbidden" for routing a new data traffic flow (e.g., CFL=100):

```
if (CLRT_{L,COS} > FLThT_{COS}) {
    CLRT_{L,COS} = CFL;
}
```
Similar checks are performed on the ratios $CLRJ_{L,COS}$ and $CLRP_{L,COS}$:
```
If (CLRJ_{L,COS} > FLThJ_{COS}) {
    CLRJ_{L,COS} = CFL;
}
if (CLRP_{L,COS} > FLThP_{COS}) {
    CLRP_{L,COS} = CFL;
}
``` where $FLThT_{COS}$ and $FLThP_{COS}$ are predetermined thresholds, similar to the threshold $FLThT_{COS}$, setting the maximum tolerable percentage of data traffic flows (of the class of service COS) in "critical" state for the other two measured end-to-end performance parameters (e.g., 80%, as the threshold $FLThT_{COS}$, or different values).

Statistically, when the data network 105 has no traffic load, the values of $WLRT_{L,COS}$, $WLRJ_{L,COS}$, $WLRP_{L,COS}$, $CLRT_{L,COS}$, $CLRJ_{L,COS}$, $CLRP_{L,COS}$ are all at zero. When the data network starts to be loaded by data traffic flows, some data traffic flows experience a worsening of performance, until some data traffic flows exceed (at least one of) the warning thresholds, thereby, for such data traffic flows, one or more of the values $WLRT_{L,COS}$, $WLRJ_{L,COS}$, $WLRP_{L,COS}$ for the links through which such data traffic flows pass become higher than zero. In calculating the cost of a certain routing path, the cost of such links will be higher compared to equivalent, less loaded links not supporting active data traffic flows in critical state. Thus, the routing algorithm implemented by the network controller entity 145 privileges the choice of links with lower values of $WLRT_{L,COS}$, $WLRJ_{L,COS}$, $WLRP_{L,COS}$. In this way, also the less loaded links are used for routing new data traffic flows, until the load on such links increases to the extent that some of the data traffic flows exceed the warning threshold, and the values $WLRT_{L,COS}$, $WLRJ_{L,COS}$, $WLRP_{L,COS}$ increase. As the data network load increases, some active data traffic flows exceed the criticality threshold, thereby the values $CLRT_{L,COS}$, $CLRJ_{L,COS}$, $CLRP_{L,COS}$ increase and cause the costs of the links to increase. When the number of active data traffic flows in critical state on a certain link exceeds one or more of the thresholds $FLThT_{COS}$, $FLThJ_{COS}$, $FLThP_{COS}$, the link is flagged as "forbidden" and is no longer used to route further data traffic flows.

At every time period p, the end-to-end performance parameters measures made on the active data traffic flows are classified and the values of the ratios of data traffic flows in warning state and in critical state (in respect of the different end-to-end performance parameters measured) are recalculated for every link of the data network. Based on these ratio values, the end-flow entity 140 calculates the links' costs and stores them (in the end-flow entity 140) to be available to the network controller entity 145. The network controller entity 145 uses the stored values as links' costs for calculating the future routing paths for new data traffic flows to be set up in such a way as to privilege the use of links having lower warning or criticality reports.

In particular, for calculating the cost of a routing path including certain link, the end-flow entity 140 can assign a static cost value $C_{L,COS}$ to each link L based on physical properties of the link. Two contributions are added to the static cost value $C_{L,COS}$: a first contribution depending on the values of $WLRT_{L,COS}$, $WLRJ_{L,COS}$, $WLRP_{L,COS}$, and a second contribution depending on the values of $CLRT_{L,COS}$, $CLRJ_{L,COS}$, $CLRP_{L,COS}$. The total cost $CTOT_{L,COS}$ of the generic link L (for the generic Class of Service COS) is thus for example given by:

$$CTOT_{L,COS} = C_{L,COS} + KWT_{COS}*WLRT_{L,COS} +$$
$$KCT_{COS}*CLRT_{L,COS} + KWJ_{COS}*WLRJ_{L,COS} +$$
$$KCJ_{COS}*CLRJ_{L,COS} + KWP_{COS}*WLRP_{L,COS} +$$
$$KCP_{COS}*CLRP_{L,COS}$$

where $KWT_{COS}$, $KCT_{COS}$, $KWJ_{COS}$, $KCJ_{COS}$, $KWP_{COS}$, $KCP_{COS}$ are weight coefficients that weigh the impact of the measure of the different end-to-end performance parameters considered on the static cost value $C_{L,COS}$.

The total cost values $CTOT_{L,COS}$ calculated for each link and stored by the end-flow entity 140 remain constant for the duration of the time period p during which the end-to-end performance measures are collected by the measure collector entity 135. The total link cost values $CTOT_{L,COS}$ are available to the network controller entity 145, which associates the calculated total link cost values $CTOT_{L,COS}$ to the data network links. Therefore, the network controller entity 145 has, for a given COS, the cost value of every data network link, and can compute the routing path (for a new data traffic flow) with the lowest cost, e.g. using any known routing algorithm adapted to choose a routing path on a graph whose arcs have known weights. Then, the network controller entity 145 instructs the network nodes for routing the new data traffic flow along the selected routing path. For example, the routing algorithm can build the set of possible routing paths between to network end points; every routing path is formed by the links that have to be traversed:

```
for (each routing path of the set of possible routing paths between two end points) {
    C_{R,COS} = 0
    for (each link L belonging to the considered routine path) {
        if (CLRT_{L,COS} != CFL && CLRJ_{L,COS} != CFL && CLRP_{L,COS} != CFL) {
            C_{R,COS} = C_{R,COS} + (C_{L,COS} + KWTcos* WLRT_{L,COS} + KCTcos* CLRT_{L,COS} + KWJ_{COS}* WLRJ_{L,COS} +
                KCJ_{COS}* CLRJ_{L,COS} + KWPcos* WLRP_{L,COS} + KCP_{COS}* CLRP_{L,COS})
        } else {
            exit // Exit the loop related to the links and analize the next routine path:
                // the current routine path is forbidden!
        }
    }
}
```

Once the costs of all the possible routing paths are calculated, the routing path chosen for being used for routing a new data traffic flow is the one having the minimum value of $C_{R,COS}$. This choice may be done exploiting the Dijkstra algorithm, that permits to find the minimum paths in a cyclic graph having a weight associated to every arc.

While in the foregoing description exemplary and non-limitative embodiments of the solution herein disclosed have been described in a certain detail, it is intended that several variants to the described embodiments, as well as other embodiments are conceivable.

The invention claimed is:

1. A method for selecting routing paths of data packets in a data network comprising a plurality of communication links and routing apparatuses, the method comprising:
   calculating and assigning to the communication links respective communication link costs;
   calculating, for at least two different routing paths in the data network, each routing path including at least one communication link, respective routing path overall costs, wherein the overall cost of a routing path depends on the communication link costs assigned to the communication links making up the routing path;
   selecting, among the at least two different routing paths, the routing path having the lower routing path overall cost;
   causing a new data packet to be routed in the data network over the selected routing path; and
   collecting measures indicative of at least one performance parameter indicating a performance of previous transmissions of data packets from origin end points that generate the data packets to destination end points that are destinations for the data packets, and using the collected measures to calculate the communication link costs,
   wherein the calculating and assigning to the communication links respective communication link costs comprises:
   comparing the measures indicative of at least one performance parameter with at least one respective performance parameter threshold value;
   in case, for a previous transmission of data packets, the at least one performance parameter threshold value is trespassed, flagging the previous transmission of data packets;
   counting numbers of flagged previous transmission of data packets routed through same communication links; and
   assigning to the communication links respective communication link costs based on the respective counts of the numbers of flagged previous transmission of data packets routed through same communication links.

2. The method of claim 1, wherein the calculating and assigning to the communication links respective communication link costs comprises:
   comparing the numbers of flagged previous transmission of data packets routed through same communication links with at least one link inhibition threshold number, and
   in case, for a communication link, the at least one link inhibition threshold number is trespassed, assigning to such communication link a predefined maximum communication link cost.

3. The method of claim 1, wherein the comparing the measures indicative of at least one performance parameter with at least one respective performance parameter threshold value comprises:
   comparing the measures indicative of at least one performance parameter with at least a warning performance parameter threshold value and a criticality performance parameter threshold value;
   in case, for a previous transmission of data packets, the warning performance parameter threshold value is trespassed but the criticality performance parameter threshold value is not trespassed, flagging the previous transmission of data packets with a first flag;
   in case, for a previous transmission of data packets, the criticality performance parameter threshold value is trespassed, flagging the previous transmission of data packets with a second flag;

counting the numbers of flagged previous transmissions of data packets flagged with the first flag routed through same communication links;

counting the numbers of flagged previous transmissions of data packets flagged with the second flag routed through same communication links; and assigning to the communication links respective communication link costs based on the respective counts of the numbers of flagged previous transmission of data packets flagged with the first flag and flagged with the second flag and routed through same communication links.

4. The method of claim 3, wherein the assigning to the communication links respective communication link costs based on the respective counts of the numbers of flagged previous transmission of data packets flagged with the first flag and flagged with the second flag and routed through same communication links comprises:

calculating first ratios between the numbers of flagged previous transmissions of data packets flagged with the first flag routed through same communication links and overall numbers of previous transmissions of data packets routed through the same communication links;

calculating second ratios between the numbers of flagged previous transmissions of data packets flagged with the second flag routed through same communication links and the overall numbers of previous transmissions of data packets routed through the same communication links; and assigning to the communication links respective communication link costs based on the first ratios and the second ratios.

5. The method of claim 4, wherein the comparing the numbers of flagged previous transmission of data packets routed through same communication links with at least one threshold number comprises comparing the second ratios with the at least one threshold number, and in case, for a communication link, the at least one link inhibition threshold number is trespassed, assigning to such communication link the predefined maximum communication link cost.

6. The method of claim 1, wherein the using the collected measures for calculating the communication link costs comprises:

obtaining topological data regarding the data network and the resources thereof used for the routing of the previous transmissions of data packets from the origin end points of the data network to the destination end points of the data network.

7. The method of claim 1, wherein the collecting measures indicative of at least one performance parameter comprises collecting measures indicative of at least two different performance parameters each indicating a performance of previous transmissions of data packets, and wherein the calculating and assigning to the communication links respective communication link costs comprises, for each communication link, summing at least two link cost contributions, each link cost contribution being based on the collected measures of a respective one of the at least two different performance parameters, each link cost contribution being weighted by a respective weight.

8. The method of claim 1, wherein the at least one performance parameter includes at least one of the following performance parameters:

end-to-end transfer time;
round-trip delay time;
end-to-end jitter;
variation in the round-trip delay time;
end-to-end data packet loss ratio;
round-trip data packet loss ratio.

9. A system for selecting routing paths of data packets in a data network comprising a plurality of communication links and routing apparatuses, wherein the routing paths each include at least one communication link, the system comprising:

a measure collector configured to collect measures indicative of at least one performance parameter indicating a performance of previous transmissions of data packets from origin end points that generate the data packets to destination end points that are destinations for the packets;

a communication link costs calculator configured to use the collected measures for calculating the communication link costs and for assigning the calculated link costs to the communication links; and a network controller being configured to:
use the calculated communication link costs to calculate, for at least two different routing paths in the data network, respective routing path overall costs, wherein the overall cost of a routing path depends on the communication link costs assigned to the communication links making up such routing path, select, among the at least two different routing paths, the routing path having the lower routing path overall cost, and cause a new data packet to be routed in the data network over the selected routing path, wherein the communication link costs calculator is configured to calculate and assign to the communication links respective communication link costs by:

comparing the measures indicative of at least one performance parameter with at least one respective performance parameter threshold value;

in case, for a previous transmission of data packets, the at least one performance parameter threshold value is trespassed, flagging the previous transmission of data packets;

counting numbers of flagged previous transmission of data packets routed through same communication links; and assigning to the communication links respective communication link costs based on the respective counts of the numbers of flaaged previous transmission of data packets routed through same communication links.

10. The system of claim 9, wherein the links' costs calculator is operable to calculate and assign to the communication links respective communication link costs by:

comparing the numbers of flagged previous transmission of data packets routed through same communication links with at least one link inhibition threshold number; and in case, for a communication link, the at least one link inhibition threshold number is trespassed, assigning to such communication link a predefined maximum communication link cost.

11. The system of claim 9, wherein, for the comparing the measures indicative of at least one performance parameter with at least one respective performance parameter threshold value, the communication link costs calculator is configured to;

compare the measures indicative of at least one performance parameter with at least a warning performance parameter threshold value and a criticality performance parameter threshold value;

in case, for a previous transmission of data packets, the warning performance parameter threshold value is trespassed but the criticality performance parameter threshold value is not trespassed, flag the previous transmission of data packets with a first flag;

in case, for a previous transmission of data packets, the criticality performance parameter threshold value is trespassed, flag the previous transmission of data packets with a second flag;

count the numbers of flagged previous transmissions of data packets flagged with the first flag routed through same communication links;

count the numbers of flagged previous transmissions of data packets flagged with the second flag routed through same communication links; and assign to the communication links respective communication link costs based on the respective counts of the numbers of flagged previous transmission of data packets flagged with the first flag and flagged with the second flag and routed through same communication links.

12. The system of claim 11, wherein, for the assigning to the communication links respective communication link costs based on the respective counts of the numbers of flagged previous transmission of data packets flagged with the first flag and flagged with the second flag and routed through same communication links, the communication link costs calculator is configured to:

calculate first ratios between the numbers of flagged previous transmissions of data packets flagged with the first flag routed through same communication links and overall numbers of previous transmissions of data packets routed through the same conununication links, calculate second ratios between the numbers of flagged previous transmissions of data packets flagged with the second flag routed through same communication links and the overall numbers of previous transmissions of data packets routed through the same communication links;

assign to the communication links respective communication link costs based on the first ratios and the second ratios.

13. The system of claim 12, wherein, for the comparing the numbers of flagged previous transmission of data packets routed through same communication links with at least one threshold number, the communication links costs calculator is configured to compare the second ratios with the at least one threshold number, and in case, for a communication link, the at least one link inhibition threshold number is trespassed, assign to such communication link the predefined maximum communication link cost.

14. The system of claim 9, wherein the communication link costs calculator is operable to use the collected measures to calculate the communication link costs by;

obtaining topological data regarding the data network and the resources thereof used for the routing of the previous transmissions of data packets from the origin end points of the data network to the destination end points of the data network.

15. The system of claim 9, wherein the measure collector is operable to collect measures indicative of at least two different performance parameters each indicating a performance of previous transmissions of data packets, and wherein the communication link costs calculator is configured to calculate and assign to the communication links respective communication link costs by summing, for each communication link, at least two link cost contributions, each link cost contribution being based on the collected measures of a respective one of the at least two different performance parameters, each link cost contribution being weighted by a respective weight.

16. The system of claim 9 wherein the at least one performance parameter includes at least one of the following performance parameters:
end-to-end transfer time;
round-trip delay time;
end-to-end jitter;
variation in the round-trip delay time;
end-to-end data packet loss ratio;
round-trip data packet loss ratio.

* * * * *